United States Patent
Zhao

(10) Patent No.: US 7,100,733 B2
(45) Date of Patent: Sep. 5, 2006

(54) METHOD TO INITIALIZE STEERING WHEEL IN A STEER-BY-WIRE SYSTEM

(75) Inventor: Zilai Zhao, Canton, MI (US)

(73) Assignee: Visteon Global Technologies, Inc., Van Buren, MI (US)

( * ) Notice: Subject to any disclaimer, the term of this patent is extended or adjusted under 35 U.S.C. 154(b) by 376 days.

(21) Appl. No.: 10/200,837

(22) Filed: Jul. 22, 2002

(65) Prior Publication Data

US 2004/0011586 A1   Jan. 22, 2004

(51) Int. Cl.
B62D 5/04   (2006.01)

(52) U.S. Cl. ............... 180/402; 701/41; 702/151

(58) Field of Classification Search ............ 180/402, 180/403, 443, 444, 446; 702/151, 87, 94; 701/41–43

See application file for complete search history.

(56) References Cited

U.S. PATENT DOCUMENTS

| | | | |
|---|---|---|---|
| 3,580,352 A | | 5/1971 | Hestad et al. |
| 5,347,458 A | * | 9/1994 | Serizawa et al. ............ 701/41 |
| 5,434,784 A | * | 7/1995 | Bradley et al. ............ 701/41 |
| 5,908,457 A | | 6/1999 | Higashira et al. |
| 5,964,814 A | | 10/1999 | Müller et al. |
| 6,041,882 A | * | 3/2000 | Bohner et al. ............ 180/402 |
| 6,082,482 A | * | 7/2000 | Kato et al. ............ 180/402 |
| 6,138,788 A | | 10/2000 | Bohner et al. |
| 6,176,341 B1 | * | 1/2001 | Ansari ............ 180/402 |
| 6,208,923 B1 | | 3/2001 | Hommel |
| 6,213,248 B1 | | 4/2001 | Kawaguchi et al. |
| 6,219,604 B1 | | 4/2001 | Dilger et al. |
| 6,227,327 B1 | | 5/2001 | Nigrin et al. |
| 6,273,468 B1 | | 8/2001 | Bohner et al. |
| 6,279,675 B1 | | 8/2001 | Bohner et al. |
| 6,336,519 B1 | | 1/2002 | Bohner et al. |
| 6,345,681 B1 | | 2/2002 | Hackl et al. |
| 6,354,396 B1 | * | 3/2002 | Horton et al. ............ 180/446 |
| 6,505,703 B1 | * | 1/2003 | Stout et al. ............ 180/446 |
| 6,653,829 B1 | * | 11/2003 | Henry et al. ............ 324/207.21 |
| 2002/0157893 A1 | * | 10/2002 | Pauly et al. ............ 180/402 |
| 2003/0212476 A1 | * | 11/2003 | Aanen et al. ............ 701/1 |

FOREIGN PATENT DOCUMENTS

EP   1 277 646   1/2003

* cited by examiner

Primary Examiner—Anne Marie Boehler
(74) Attorney, Agent, or Firm—Brinks Hofer Gilson & Lione

(57) ABSTRACT

A system for initializing a steering wheel in a steer-by-wire vehicle includes a steering wheel, a torque feedback actuator, a steering wheel angle sensor, and a controller. The controller is adapted to calculate a corrected steering wheel angle based upon the relative angular positions of the road wheels and the steering wheel as measured by the respective sensors. The controller then controls the torque feedback generator to rotate the steering wheel into a corrected position such that the torque feedback generator rotates the steering wheel a minimum angle. The controller issues a warning signal in response to any resistance to the correction, including interference from the vehicle driver.

6 Claims, 4 Drawing Sheets

METHOD TO INITIALIZE STEERING WHEEL IN A STEER-BY-WIRE SYSTEM

BACKGROUND OF THE INVENTION

1. Technical Field of the Invention

The present invention relates to a steering apparatus for a vehicle that orients road wheels in response to operator input in which the road wheels are not mechanically coupled to the steering wheel.

2. Background and Summary of the Present Invention

A typical automotive vehicle is steered by transmitting the rotation of a steering wheel to a steering mechanism, which directs road wheels in a corresponding fashion. Generally, the steering wheel is located inside the vehicle passenger compartment, and the road wheels are located at the front of the vehicle. Thus, a suitable steering mechanism is necessary to couple the steering wheel and the road wheels.

A representative steering mechanism is a rack-and-pinion type steering mechanism. In a rack-and-pinion steering mechanism, the rotational motion of the steering wheel is communicated through a steering shaft to a pinion gear at its distal end. The pinion gear is engaged with a rack gear disposed laterally between the road wheels, which in turn are coupled to the rack gear by tie rods. In this manner, rotation of the steering wheel is translated into the lateral movement of the rack gear, which causes the road wheels to pivot in the desired direction. In general, mechanical steering mechanisms are power-assisted by hydraulic or electrical assist units.

Mechanical steering mechanisms such as described above have a number of limitations. As the steering wheel and the steering mechanism are mechanically coupled in some fashion, the position of the steering wheel is limited within the vehicle passenger compartment. Moreover, the size and weight of the coupling members limits the layout and performance of the vehicle.

In order to overcome such limitations, it has been proposed to utilize a steering system in which the steering wheel is not mechanically coupled to the road wheels and the road wheels and steering movement is achieved by an electrically controlled motor, for example, a steer-by-wire system. In a steer-by-wire system, a steering actuator operates in response to detected values of various steering parameters, such as steering wheel angle and vehicle speed. The detected values are communicated electronically to the steering actuator from sensors, whereby the steering actuator orients the road wheels in the desired direction.

Steer-by-wire systems solve a number of problems presented above. In addition, there are a number of other advantages innate to steer-by-wire systems that were not apparent in its mechanically coupled counterpart. For example, a steer-by-wire steering system can be integrated into other electronically controlled systems to increase the efficiency and performance of the vehicle.

Although a steer-by-wire system presents distinct advantages, it also presents a number of problems. Since there is no direct mechanical coupling between the operator and the road wheels, it is not necessary for the orientation of the steering wheel to correspond to the orientation of the road wheels. For example, it is possible that the steering wheel could be directed in a left-turn orientation while the road wheels are directed in a right-turn orientation. Such a discrepancy may arise when the steer-by-wire system is powered-down, as is the case when the vehicle is turned off, and the steering wheel is turned without a corresponding pivoting of the road wheels.

Consequently, there is a need in the art for an improved steer-by-wire system that is adapted to correct for misalignment between the steering wheel and the road wheel, and which corrects the misalignment automatically. Furthermore, the steer-by-wire system should be able to correct for misalignment in an efficient and timely manner, such that the steering wheel travels a minimum angular distance from an initial position to the corrected position.

Accordingly, the present invention provides an improved steer-by-wire system comprising a road wheel angle sensor, a steering wheel angle sensor, and a torque feedback actuator. The aforementioned components are coupled to a controller that is adapted to calculate a corrected steering wheel angle based upon the relative angular positions of the road wheels and the steering wheel as measured by the respective sensors. The controller then controls the torque feedback generator to rotate the steering wheel into a corrected position such that the torque feedback generator rotates the steering wheel a minimum angle. During the initialization, the rotational motion of the steering wheel is also controlled so that the rotation is smooth and in an acceptable low speed to ensure the safety of the driver. By checking the smoothness and the progression of the rotational motion, the controller will detect any resistance to the correction that is greater than the anticipated rotational friction. Such resistance includes interference from the vehicle driver. In response to any resistance, the controller is further adapted to issue a warning signal.

DETAILED DESCRIPTION OF THE PREFERRED EMBODIMENT

Figure 1:
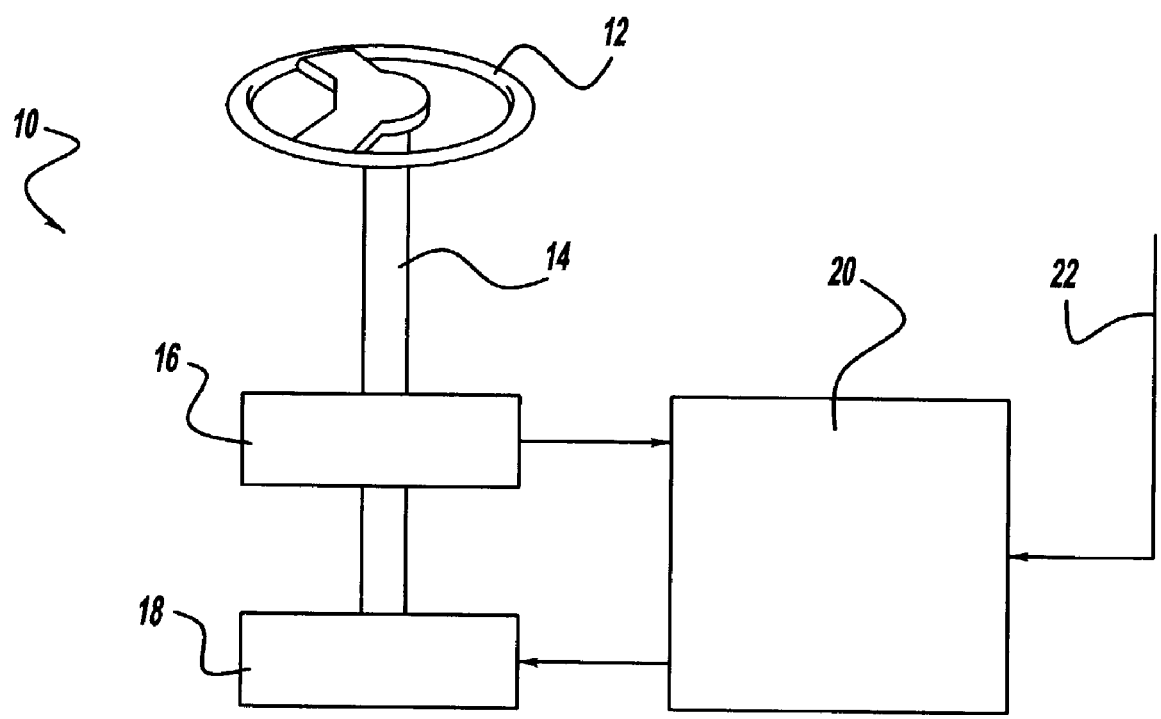
FIG. 1 is a schematic block diagram of the steer-by-wire system of the present invention.

In accordance with a preferred embodiment of the present invention, FIG. 1 depicts a schematic block diagram of a steer-by-wire system 10 for use in a motor vehicle. The steer-by-wire system includes a steering wheel 12 rotatable about a shaft 14. The steering wheel 12 is mechanically coupled to a torque actuator 18 through the shaft 14. The torque actuator 18 is further electrically connected to a controller 20, which controls the magnitude and the direction of a reaction torque in the steering wheel 12 as is the case in a typical steer-by-wire system. The system of the present invention also includes at least one steering wheel angle sensor 16 detecting a steering wheel angle. The detected steering wheel angle is transmitted to the controller 20, which is also adapted to receive an input value corresponding to a road wheel angle 22. The road wheel angle is preferably determined by one or more road wheel angle sensors (not shown) disposed near the road wheels of the vehicle (not shown).

During normal operation, the steer-wire-system 10 of the present invention simulates the feel of steering a mechanical steering system in the steering wheel 12. This simulated feel is the effect of torque generated by the torque actuator 18. The torque actuator 18 is controlled by the controller 20 to cause a torque in the shaft 14 and the steering wheel 12 for communicating steering information to a vehicle operator. The steer-by-wire system 10 of the present invention is further adapted to efficiently correct any variation between the detected steering wheel angle and the detected road wheel angle upon starting the vehicle.

Figure 2:
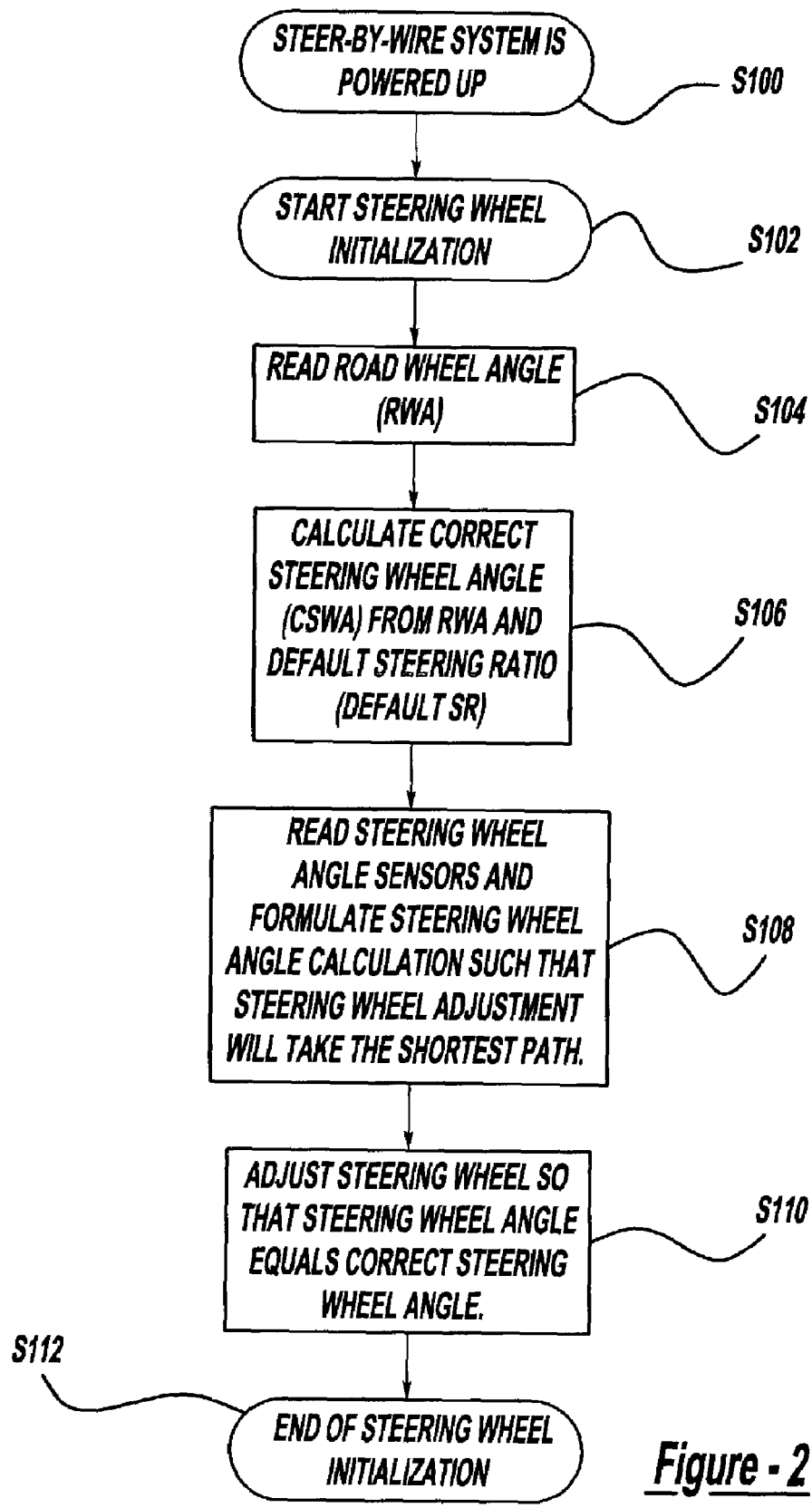
FIG. 2 is a flow chart describing the method of the present invention.

FIG. 2 is a flow chart depicting the operation of the steer-by-wire system of the present invention. In step S100, the steer-by-wire system is powered-up, preferably simultaneous with the electrical components of the vehicle, such as just prior to ignition in an internal combustion vehicle. Alternatively, the steer-by-wire system may be powered-up at any time such that the following steps may be completed prior to driving. In step S102, the initialization of the steering wheel is started.

In step S104, the road wheel angle (RWA) is read and transmitted to the controller 20. In step S106, the correct steering wheel angle (CSWA) is calculated based upon a default steering ratio (DSR). The DSR is a value that is predetermined in the steer-by-wire system 10 such that the steer-by-wire system closely approximates a mechanical steering system. Likewise, a mechanical steering system would have a DSR value determined by the mechanical components of the system. In the steer-by-wire system 10 of the present invention, the DSR may be altered during vehicle operation. In terms of the RWA and DSR, the CWSA is determined as follows:

$$CSWA = RWA*DSR. \quad (1)$$

The CSWA value is retained by the controller 20 for comparison with the actual steering wheel angle.

In step S108, the controller 20 receives the steering wheel angle (SWA) measurement from the at least one steering wheel angle sensor 16. The controller 20 then compares the CSWA to the SWA, and, if they are not identical, the controller 20 calculates a corrective adjustment to the SWA such that the steering wheel 12 will be rotated the shortest angular distance. The details of the later calculation will be discussed more thoroughly below.

In step S110, the controller 20 controls the torque actuator 18 to rotate the steering wheel 12 such that it is in the CSWA position. In step S112, the steer-by-wire initialization is complete, and the steer-by-wire system may begin its normal mode of operation.

Returning now to step S108, the present invention is adapted for use in vehicles having different types of steering wheel angle sensors 16. Consequently, the calculation of the shortest angular distance for correcting the SWA will depend upon the type and combination of steering wheel angle sensors 16 employed in the steer-by-wire system 10. The present invention contemplates at least three types of steering wheel angle sensors 16. A first type of steering wheel angle sensor is a multi-turn absolute angular position sensor, hereby denoted a type 1 sensor. A second type of steering wheel angle is a single-turn absolute angular position sensor, hereby denoted a type 2 sensor. A third type of steering wheel angle sensor is an incremental angular position sensor, hereby denoted a type 3 sensor. Each of the foregoing sensors generates a distinct steering wheel angle value, hereby denoted SWA1, SWA2, and SWA3, respectively.

The steering wheel angle values, SWA1, SWA2, and SWA3, are related to the actual SWA through mathematical relationships that are employed by the controller 20 in calculating the proper steering wheel angle.

Figure 3:
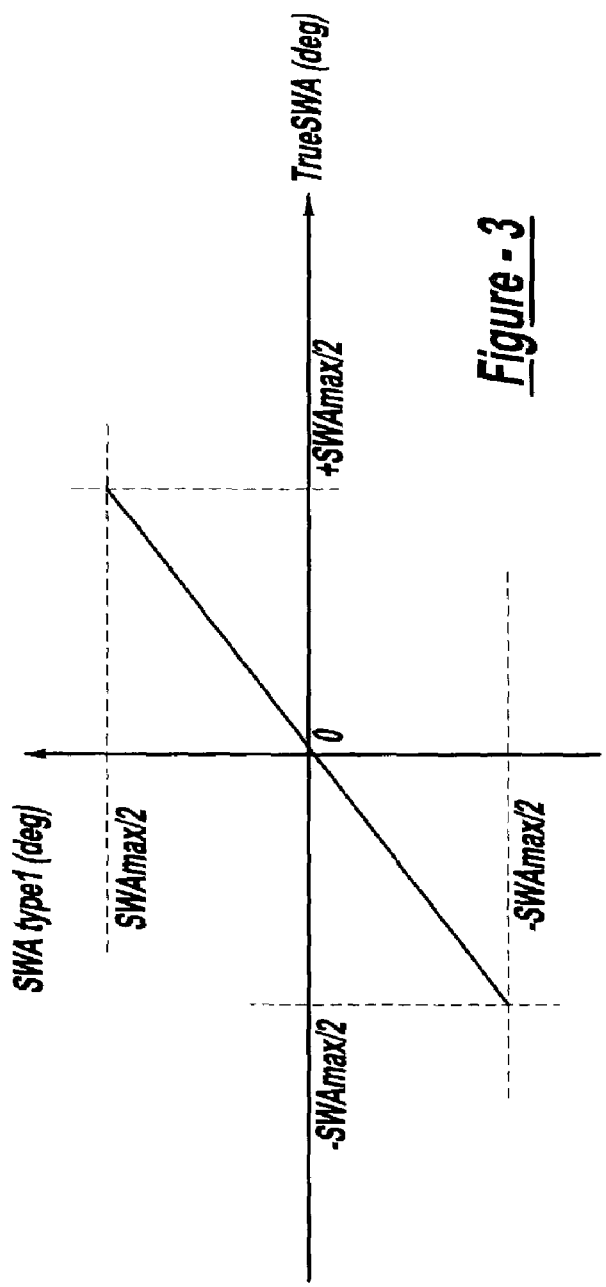
FIG. 3 is a graphical representation of the relationship between true steering wheel angle and steering wheel angle calculated by a first steering wheel angle sensor.

FIG. 3 is a graphical representation of the relationship between the actual SWA and the SWA1 as calculated by the type 1 sensor. As shown, a type 1 sensor generates a steering wheel angle value that is identical to the actual SWA over the range of steering wheel angles. That is, for a type 1 sensor, $$SWA=SWA1. \quad (2)$$

The measurements of the type 1 sensor are restricted to the total angular displacement of the steering wheel 12. That is, if the steering wheel 12 is confined to rotation between −450° and +450°, then the SWA1 measurement will be confined to the same range.

Figure 4:
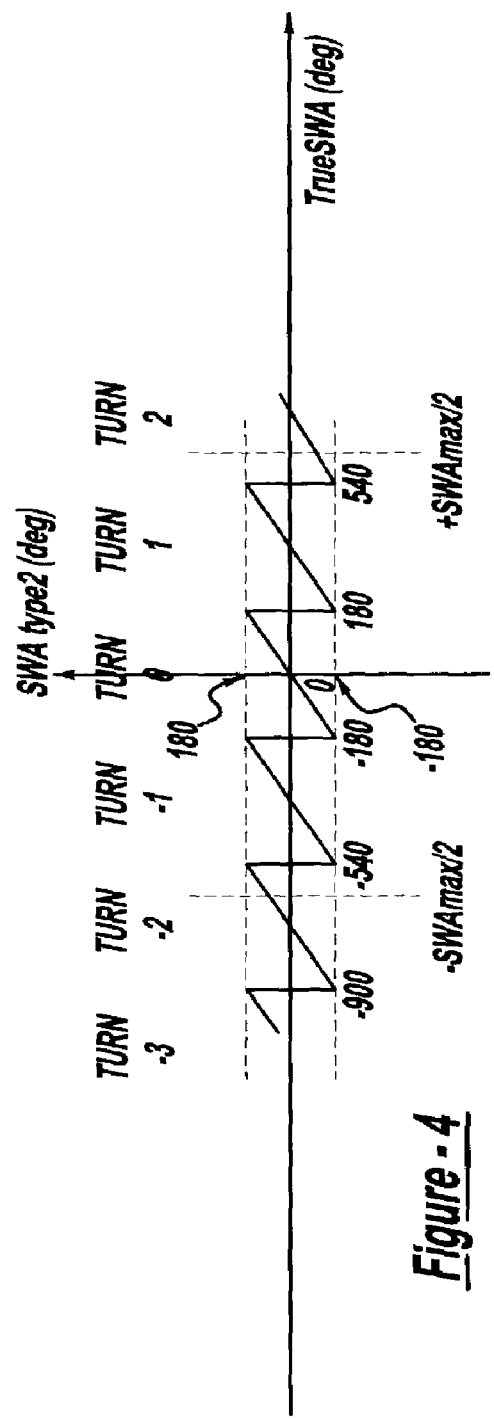
FIG. 4 is a graphical representation of the relationship between true steering wheel angle and steering wheel angle calculated by a second steering wheel angle sensor.

FIG. 4 is a graphical representation of the relationship between the actual SWA and the SWA2 as calculated by the type 2 sensor. As shown, a type 2 sensor generates a steering wheel angle value that is periodic every 360°. Consequently, the SWA2 value is only indicative of the actual SWA is calibrated based upon the number of 360° periods the steering wheel 12 has been rotated. That is, for a type 2 sensor, $$SWA=SWA2+N*360°, \quad (3)$$

where the integer N is defined as a number of turns or full rotations of the steering wheel 12.

Figure 5:
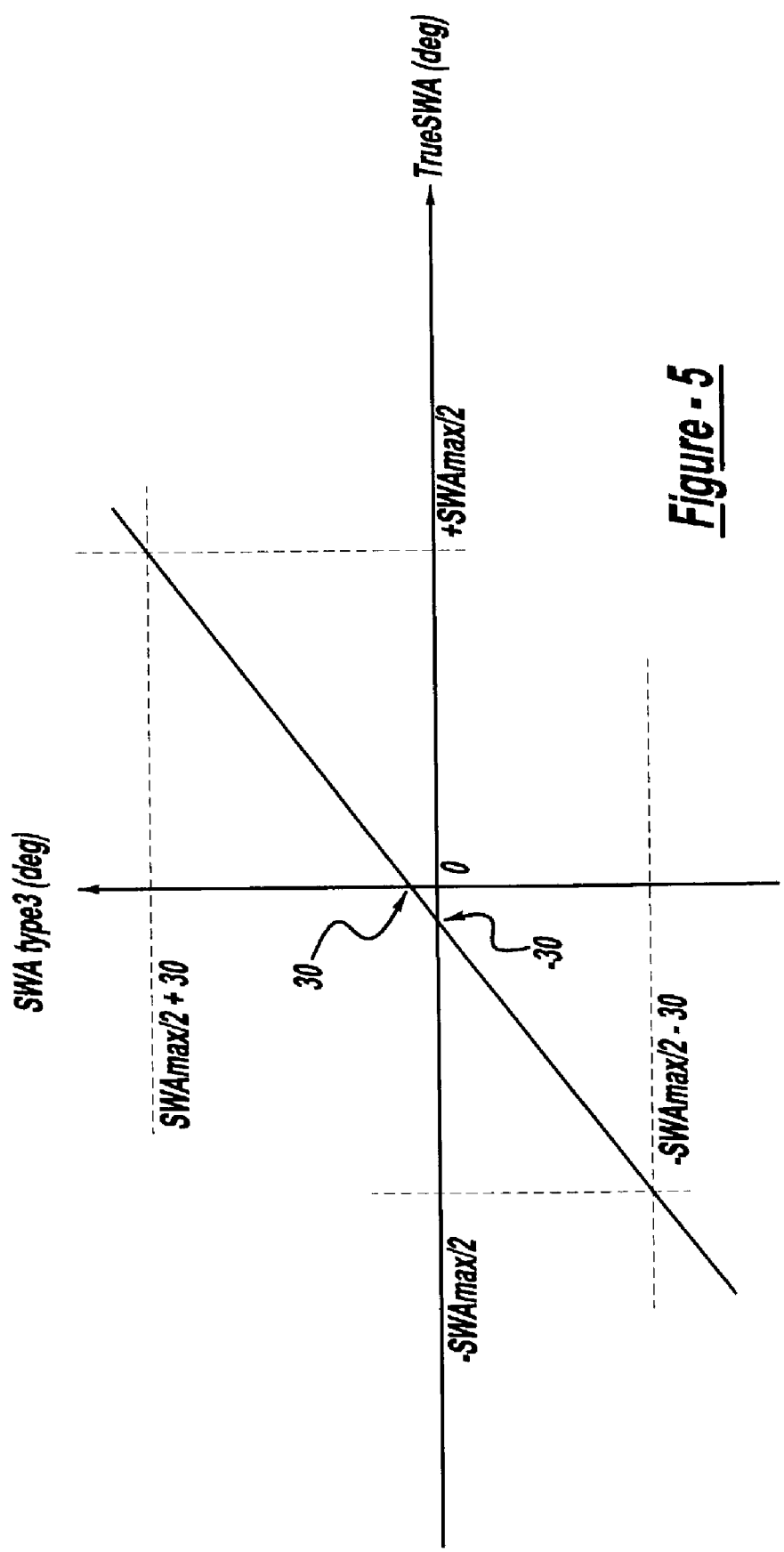
FIG. 5 is a graphical representation of the relationship between true steering wheel angle and steering wheel angle calculated by a third steering wheel angle sensor.

FIG. 5 is a graphical representation of the relationship between the actual SWA and the SWA3 as calculated by the type 3 sensor. The type 3 sensor does not calculate an absolute steering wheel angle. Rather, a type 3 sensor will measure the relative angular displacement between a current angular position, SWA(t1), and an initial angular position, $SWA_i(t0)$. That is, a type 3 sensor measures a change in steering wheel angle between an initial, start-up position, and a subsequent steering position. FIG. 5 depicts an initial state of a type 3 sensor in the case that the steer-by-wire system 10 is powered-up when the steering wheel 12 is in a −30° orientation. As such, the type 3 steering wheel angle sensor is measuring a steering wheel angle that is shifted by −30° along the SWA axis of FIG. 5.

As a result, a type 3 sensor requires an additional input corresponding to the initial absolute angular position to be useful in the present application. If the absolute angular position is known at an initial time, t0, then at a subsequent time t1 the following relationship holds:

$$SWA(t1)=SWA3(t1)-SWA3(t0)+SWA_i(t0),$$

where t1>t0, and $SWA_i(t0)$ is the absolute angular position of the steering wheel at an initial time, t0. Despite the limitations presented by a type 3 sensor, they are more durable and accurate than both type 1 and type 2 sensors. The present invention preferably contemplates the use of a type 3 sensor. However, in order to determine an initial absolute angular position rendering a type 3 sensor useful, it is preferable to combine a type 3 sensor with one of a type 1 sensor or a type 2 sensor.

There are four combinations that are suitable for the steering wheel angle sensor 16. A type 1 sensor or a type 2 sensor may be used alone, with certain modifications. Additionally, either a type 1 sensor or a type 2 sensor may be used in conjunction with a type 3 sensor. In the latter configurations, the type 1 sensor or type 2 sensor would be used solely for the initialization procedure described in FIG. 2, and the type 3 sensor would be used during normal vehicle operation.

In the first configuration, the type 1 sensor is adapted to calculate an absolute steering wheel angle. Therefore, the controller 20 can adjust the position of the steering wheel 12 by causing SWA1 to be equal to the CSWA. Note that as described, the type 1 sensor does not enable the controller 20 to execute the adjustment of the steering wheel along a shortest angular path, because the use of a type 1 sensor necessarily prohibits a shortest angular path, i.e. all angles are absolute. Thus, in the first configuration, step S110 shown in FIG. 2 is irrelevant to the initialization of the steer-by-wire system 10.

In the second configuration, the type 2 sensor is adapted to calculate a periodic angular position. As noted in Equation (3), in order to properly initialize the steer-by-wire system, the initial turn number, N, must be known. The controller 20 can adjust the position of the steering wheel 12 by causing SWA2 to be equal to the CSWA. In order to satisfy the shortest angular path condition of step S110, the controller 20 must minimize the following arithmetical expression:

$$CSWA-(SWA2+N*360°)=\text{minimum}, \quad (5)$$

where N is a turn number. Equation (5) can be minimized by solving the following expression:

$$N_{min}=\text{Round}((CSWA-SWA2)/360°), \quad (6)$$

where the function Round (x) rounds x to the nearest integer. When a value for $N_{min}$ is determined, the actual steering wheel angle is given by the following equation:

$$SWA=SWA2+N_{min}*360°. \quad (7)$$

For example, if $N_{min}$ is zero, then the actual steering wheel angle is equal to the steering wheel angle measured by the type 2 sensor.

In the third configuration, the type 1 sensor is used in conjunction with the type 3 sensor. Therefore, Equation (4) is modified as follows:

$$SWA(t1)=SWA3(t1)-SWA3(t0)+SWA1_i(t0),$$

where $SWA1_i(t0)$ is the absolute initial steering wheel angle position at initial time, t0. As in the first configuration, there is no shortest angular path for the controller 20 to determine, so step S110 is bypassed. In the third configuration, the type 1 sensor is actuated solely for the initialization process, and it is shut down at step S112 corresponding to the end of the initialization process.

In the fourth configuration, the type 2 sensor is used in conjunction with the type 3 sensor. Accordingly, at the initial time, t0, the controller determines initial values and determines $N_{min}$ and SWA as follows.

$$N_{min}=\text{Round}((CSWA(t0)-SWA2(t0))/360°),$$

and $$SWA2_i(t0)=SWA2(t0)+N_{min}*360°.$$

Using Equation (10), Equation (4) is modified as follows:

$$SWA(t1)=SWA3(t1)-SWA3(t0)+SWA2_i(t0),$$

where $SWA2_i(t0)$ is the initially-corrected determination of the shortest path in accordance with Equations (4) and (10). As in the third configuration, the type 2 sensor is actuated solely for the initialization process, and it is shut down at step S112 corresponding to the end of the initialization process. As described, each of the foregoing configurations of steering wheel angle sensors is employable as reference 16 in FIG. 1.

Returning to FIG. 2, in step S110 the controller 20 controls the torque actuator 18 to rotate the steering wheel 12 to a correct steering wheel angle. In doing so, the torque actuator 18 exerts a corrective torque on the shaft 14 that is translated to the steering wheel 12.

In a preferred embodiment, the controller 20 is further adapted for checking the smoothness and progression of the rotational motion of the steering wheel 12 in order to detect an opposition to the corrective torque. For example, if the torque actuator 18 is rotating the steering wheel 12 during the initialization phase and the driver exerts an opposing torque, then the controller 20 will detect the opposition. Additionally, if the controller 20 detects an opposing torque, then it will issue a warning signal to the driver to cease opposing the initialization process.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

The invention claimed is:

1. A steer-by-wire system comprising:
   a steering wheel angle sensor adapted to detect an angular displacement of a steering wheel;
   a torque feedback actuator adapted to generate feedback torque in the steering wheel; and
   a controller receiving a road wheel angle, and further cooperating with said steering wheel angle sensor to determine a steering wheel angle;
   whereby said controller corrects the position of the steering wheel relative to the road wheel angle by calculating a corrected steering wheel angle relative to the at least one road wheel and directs said torque feedback actuator to rotate said steering wheel to the corrected steering wheel angle;
   whereby said controller calculates a minimum angular displacement through which the steering wheel may be rotated to the corrected steering wheel angle; and
   wherein the steering wheel angle sensor includes a incremental angular sensor adapted to determine an angular position of the steering wheel relative to an initial steering wheel angle position wherein the controller is adapted to detect a negative torque that impedes the rotation of said steering wheel and issues a warning signal in response to the negative torque.

2. A method of initializing a steer-by-wire system in a vehicle having a steering wheel and at least one road wheel, said method comprising:
   detecting an angular displacement of an at least one road wheel;
   detecting an angular displacement of a steering wheel;
   calculating a corrected steering wheel angle relative to the at least one road wheel,
   rotating the steering wheel a preferred angular distance such that the steering wheel is aligned with the at least one road wheel; and
   detecting a negative torque that impedes the rotation of the steering wheel, and further comprising the step of issuing a warning signal in response to the negative torque.

3. The method of claim 2 wherein the preferred angular distance is a minimum angular distance.

4. A steer-by-wire system comprising:

a steering wheel single sensor adapted to detect an angular displacement of a steering wheel;

a torque feedback actuator adapted to generate feedback torque in the steering wheel; and a controller receiving a road wheel angle, and further cooperating with said steering wheel angle sensor to determine a steering wheel angle;

whereby said controller corrects the position of the steering wheel relative to the road wheel angle by calculating a corrected steering wheel angle relative to the at least one road wheel and directs said torque feedback actuator to rotate said steering wheel to the corrected steering wheel angle;

whereby said controller calculates a minimum angular displacement through which the steering wheel may be rotated to the corrected steering wheel angle; and wherein the steering wheel angle sensor includes a incremental angular sensor adapted to determine an angular position of the steering wheel relative to an initial steering wheel angle position wherein the steering wheel angle is modified according to the relationship $$SWA(t1) = SWA3(t1) - SWA3(t0) + SWA2_i(t0)$$

where $t0$ is an initial time and $t1$ is a subsequent time, $SWA(t1)$ is the corrected steering wheel angle, and $SWA3(t1)$ is the steering wheel angle of the incremental angular sensor at time $t1$, $SWA3(t0)$ is the steering wheel angle of the incremental sensor at time $t0$, and $SWA2_i(t0)$ is the initially corrected determination of the shortest angular path.

5. The steer-by-wire system of claim 4, wherein the shortest angular path is calculated according to the relationship $$SWA2_i(t0) = SWA2(t0) + N_{min} * 360°$$

where $t0$ is an initial time and $t1$ is a subsequent time, $SWA2_i(t0)$ is the initially corrected determination of the shortest angular path, $N_{min}$ is a minimum number of turns to correct the steering angle, and $SWA2(t0)$ a steering wheel angle based upon the number of 360° periods the steering wheel has been rotated.

6. A steer-by-wire system comprising:

a steering wheel angle sensor adapted to detect an angular displacement of a steering wheel;

a torque feedback actuator adapted to generate feedback torque in the steering wheel; and a controller receiving a road wheel angle, and further cooperating with said steering wheel angle sensor to determine a steering wheel angle;

whereby said controller corrects the position of the steering wheel relative to the road wheel angle by calculating a corrected steering wheel angle relative to the at least one road wheel and directs said torque feedback actuator to rotate said steering wheel to the corrected steering wheel angle;

whereby said controller calculates a minimum angular displacement through which the steering wheel may be rotated to the corrected steering wheel angle and wherein the controller is adapted to detect a negative torque that impedes the rotation of said steering wheel and issues a warning signal in response to the negative torque.

* * * * *

UNITED STATES PATENT AND TRADEMARK OFFICE
CERTIFICATE OF CORRECTION

| | | |
|---|---|---|
| PATENT NO. | : 7,100,733 B2 | |
| APPLICATION NO. | : 10/200837 | |
| DATED | : September 5, 2006 | |
| INVENTOR(S) | : Zilai Zhao | |

It is certified that error appears in the above-identified patent and that said Letters Patent is hereby corrected as shown below:

On the Title Page

In column 1, line 4, under "U.S. PATENT DOCUMENTS", delete "5,908,457" and substitute --5,907,457-- in its place.

Signed and Sealed this

Twenty-fourth Day of April, 2007

JON W. DUDAS
*Director of the United States Patent and Trademark Office*